(12) United States Patent
Larson et al.

(10) Patent No.: US 12,595,866 B1
(45) Date of Patent: Apr. 7, 2026

(54) COMPRESSION PIPE FITTING

(71) Applicant: Mueller International, LLC, Atlanta, GA (US)

(72) Inventors: Ryan Fairchild Larson, Decatur, IL (US); Rock Allen Powell, Jr., Mr. Zion, IL (US)

(73) Assignee: Mueller International, LLC, Atlanta, GA (US)

(*) Notice: Subject to any disclaimer, the term of this patent is extended or adjusted under 35 U.S.C. 154(b) by 0 days.

(21) Appl. No.: 18/953,870

(22) Filed: Nov. 20, 2024

(51) Int. Cl.
 *F16L 21/06* (2006.01)

(52) U.S. Cl.
 CPC .................................. *F16L 21/065* (2013.01)

(58) Field of Classification Search
 CPC ......... F16L 21/08; F16L 21/007; F16L 21/03; F16L 21/04; F16L 19/06; F16L 19/065; F16L 19/0653; F16L 25/04; F16L 25/06; F16L 25/065; F16L 25/12; F16L 37/10; F16L 37/101; F16L 47/12; F16L 27/113; F16L 27/1136
 See application file for complete search history.

(56) References Cited

U.S. PATENT DOCUMENTS

| | | | |
|---|---|---|---|
| 1,898,623 | A | 2/1933 | Gammeter |
| 2,508,914 | A | 5/1950 | Graham |
| 3,429,587 | A | 2/1969 | Kish |
| 3,486,777 | A | 12/1969 | Bird |
| 3,733,093 | A | 5/1973 | Seiler |
| 3,843,167 | A | 10/1974 | Gronstedt |
| 3,860,270 | A | 1/1975 | Arnold |
| 3,915,480 | A | 10/1975 | Kish et al. |
| 3,999,782 | A * | 12/1976 | Shotbolt ............... F16L 21/007 |
| | | | 285/912 |
| 4,466,640 | A | 8/1984 | Van Houtte |
| 4,786,087 | A | 11/1988 | Thewlis et al. |
| 5,160,175 | A | 11/1992 | Yang |
| 5,335,946 | A | 8/1994 | Dent et al. |
| 6,447,018 | B1 | 9/2002 | Ball |
| 7,004,511 | B2 | 2/2006 | Barron et al. |
| 7,063,356 | B2 | 6/2006 | Barker |

(Continued)

FOREIGN PATENT DOCUMENTS

| | | |
|---|---|---|
| DE | 29724671 | 11/2002 |
| EP | 0870967 | 10/1998 |

(Continued)

OTHER PUBLICATIONS

Larson, Ryan Fairchild; Requirement for Restriction/Election for U.S. Appl. No. 18/922,536, filed Oct. 22, 2024, mailed Oct. 14, 2025, 8 pgs.

(Continued)

*Primary Examiner* — Aaron M Dunwoody
(74) *Attorney, Agent, or Firm* — TAYLOR DUMA LLP

(57) ABSTRACT

A compression fitting including a body portion defining a first end portion, and a grip ring assembly with a grip ring disposed within the first end portion, the grip ring being movable from a first axial position to a second axial position with respect to the longitudinal center axis of the first end portion, wherein the grip ring is disposed in the first axial position when the compression fitting is in a loosened configuration, and in the second axial position when the compression fitting is in the tightened.

21 Claims, 10 Drawing Sheets

(56)                    References Cited

U.S. PATENT DOCUMENTS

| | | | |
|---|---|---|---|
| 7,552,949 | B2 | 6/2009 | Riordan, III et al. |
| 11,566,732 | B2 | 1/2023 | Furcoiu et al. |
| 2010/0148489 | A1 | 6/2010 | Pohn et al. |
| 2024/0117905 | A1 | 4/2024 | Huddleston |

FOREIGN PATENT DOCUMENTS

| | | |
|---|---|---|
| KR | 20100046355 A | 5/2010 |
| KR | 20110127476 A | 11/2011 |
| KR | 20190053647 | 5/2019 |

OTHER PUBLICATIONS

Larson, Ryan Fairchild; Non-Final Office Action for U.S. Appl. No. 18/977,598, filed Dec. 11, 2024, mailed Sep. 23, 2025, 17 pgs.
Larson, Ryan Fairchild; Requirement for Restriction/Election for U.S. Appl. No. 18/977,598, filed Dec. 11, 2024, mailed Aug. 15, 2025, 9 pgs.
Larson, Ryan Fairchild; Non-Final Office Action for U.S. Appl. No. 18/981,036, filed Jan. 9, 2025, mailed Sep. 18, 2025, 12 pgs.
Larson, Ryan Fairchild; Final Office Action for U.S. Appl. No. 18/977,598, filed Dec. 11, 2024, mailed Jan. 21, 2026, 17 pgs.
Larson, Ryan Fairchild; Non-Final Office Action for U.S. Appl. No. 18/922,536, filed Oct. 22, 2024, mailed Jan. 30, 2026, 27 pgs.
Larson, Ryan Fairchild; Notice of Allowance for U.S. Appl. No. 18/981,036, filed Jan. 9, 2025, mailed Feb. 2, 2026, 11 pgs.

\* cited by examiner

SEE FIG. 4B

COMPRESSION PIPE FITTING

TECHNICAL FIELD

This disclosure relates to a pipe fitting for connecting piping components. More specifically, this disclosure relates to a compression pipe fitting that can be tightened with a power tool or manual tool.

BACKGROUND

Pipe fittings are commonly used to connect two piping components together to form a pipe connection, such as when installing a pipe system or a pipe infrastructure. Some pipe fittings require tightening one or more fasteners to secure the piping components to the pipe fitting. Typically, each of the fasteners is tightened using two wrenches, which can be difficult due to excessive torque and/or limited space surrounding the fitting within which to rotate the wrenches.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a compression fitting configurable in a loosened configuration and a tightened configuration, comprising a body portion defining a first end portion; and a grip ring assembly comprising a grip ring disposed within the first end portion, the grip ring being movable from a first axial position to a second axial position with respect to the longitudinal center axis of the first end portion, wherein the grip ring is disposed in the first axial position when the compression fitting is in the loosened configuration, and the grip ring is disposed in the second axial position when the compression fitting is in the tightened configuration.

Also disclosed is a pipeline assembly comprising a first piping component having a proximal end; and a compression fitting configurable in a loosened configuration and a tightened configuration, comprising a body portion defining a first end portion and a second end portion; and a grip ring assembly comprising a grip ring disposed within the first end portion, the grip ring being movable from a first radial position to a second radial position with respect to the longitudinal center axis of the first end portion, wherein the grip ring is disposed in the first radial position when the compression fitting is in the loosened configuration, and the grip ring is disposed in the second radial position when the compression fitting is in the tightened configuration, and wherein the grip ring engages an outer surface of the proximal end of the first piping component when the compression fitting is in the tightened configuration.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, and features particularly pointed out in the appended claims. These and other features will become more fully apparent from the following description and appended claims or maybe learned by the practice of such exemplary implementations as set forth hereinafter.

BRIEF DESCRIPTION OF THE DRAWINGS

The accompanying drawings, which operated in and constitute a part of this specification, illustrate several aspects of the disclosure and, together with the description, explain various principles of the disclosure. The drawings are not necessarily drawn to scale. Corresponding features and components throughout the figures may be designated by matching reference characters for the sake of consistency and clarity.

DETAILED DESCRIPTION

Figure 1:
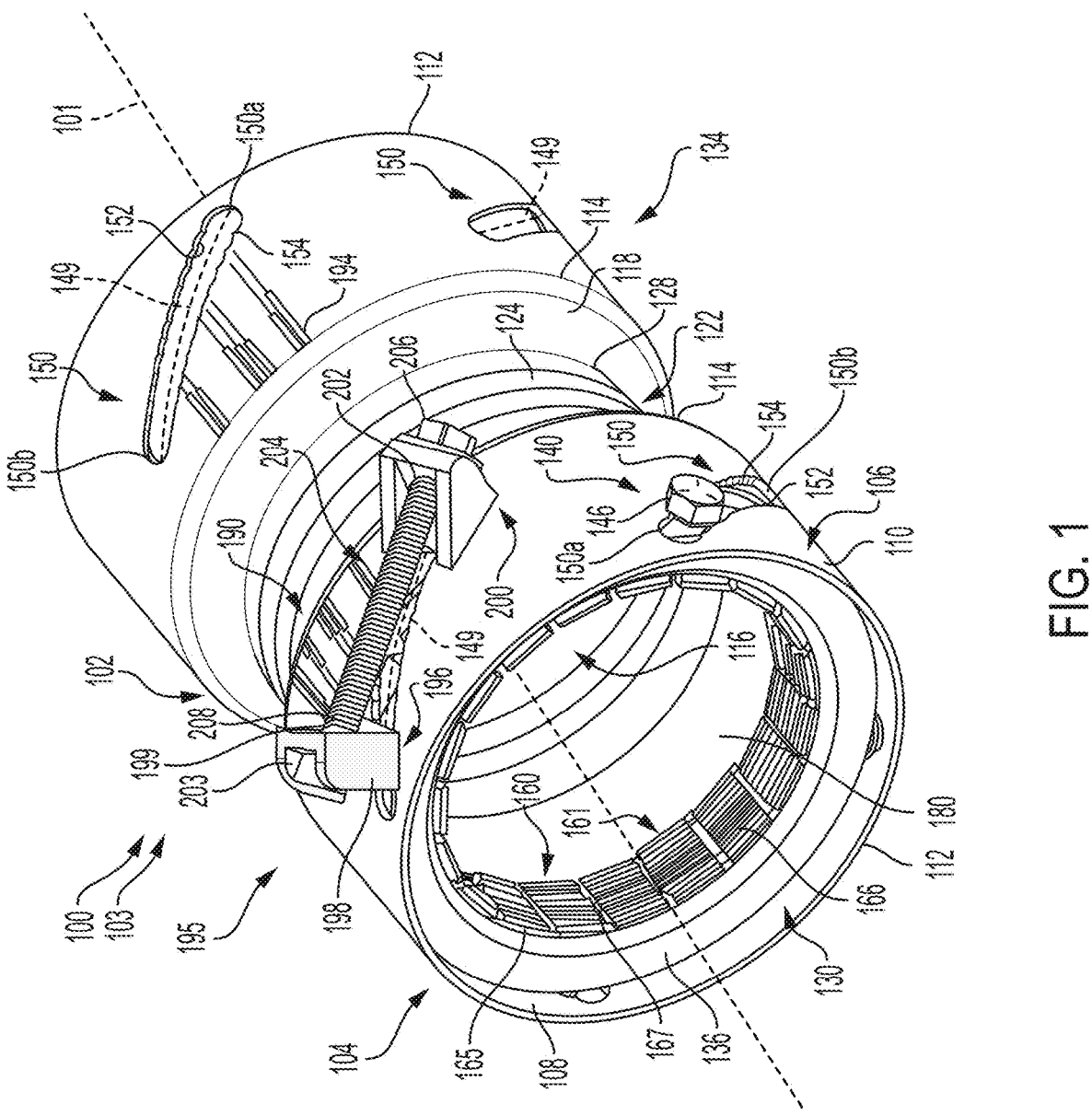
FIG. 1 is a top perspective view of a compression pipe fitting in accordance with an example aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc., of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a compression pipe fitting for connecting piping components and associated methods, systems, devices, and various apparatus. The compression pipe fitting can comprise a body portion and a tightening assembly that can be tightened by either a power tool or a manual tool. It would be understood by one of skill in the art that the disclosed pipe fitting is described in but a few exemplary aspects among many. No particular terminology or description should be considered limiting on the disclosure or the scope of any of the claims issuing therefrom.

Figure 9:
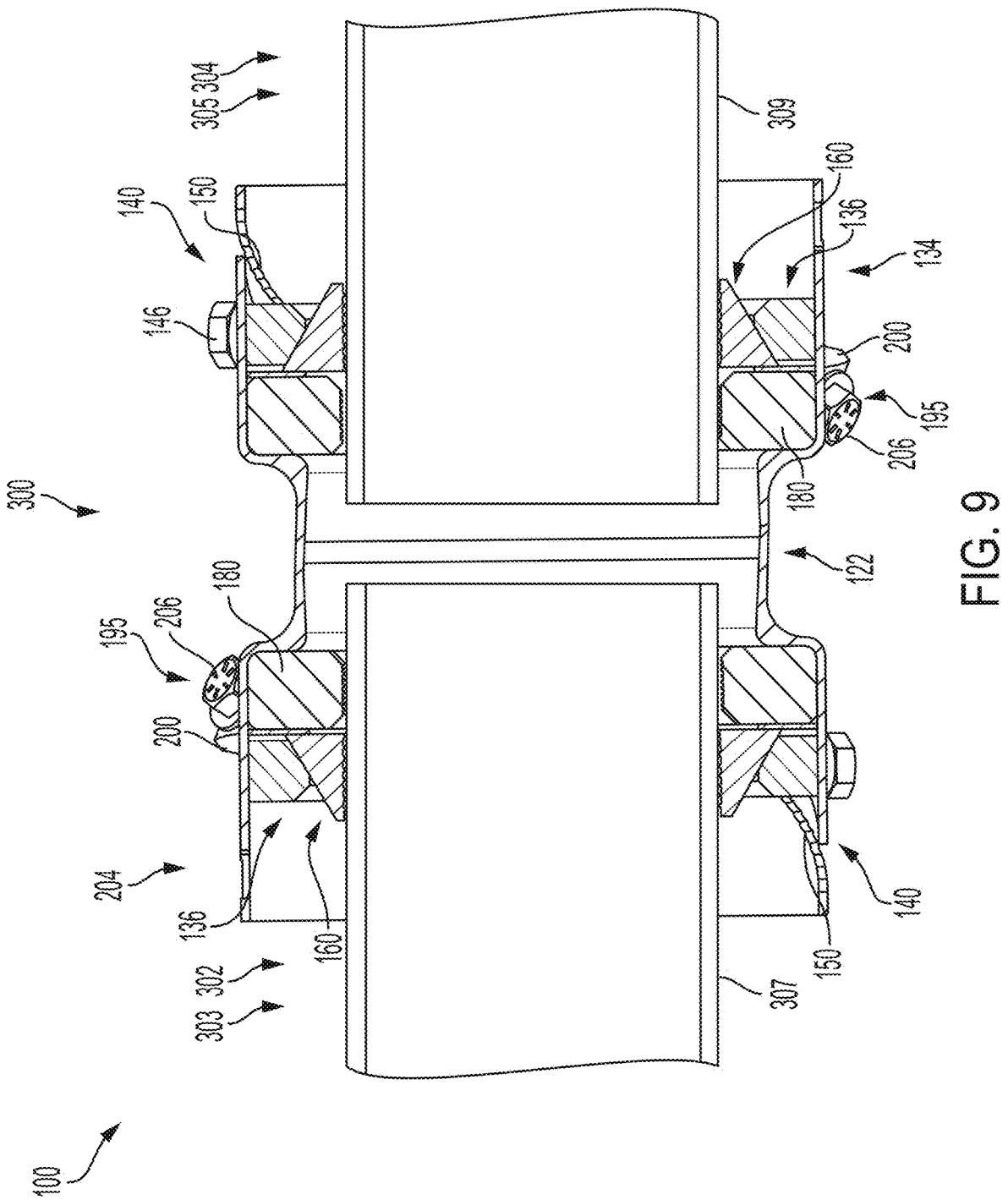
FIG. 9 is a cross-sectional view of a pipeline assembly including the compression pipe fitting of FIG. 1 taken along line 9-9 as indicated in FIG. 3.

A first aspect of a compression pipe fitting 100, and more specifically, a bolt compression pipe fitting 103, is disclosed and described in FIGS. 1 through 4B. The compression pipe fitting 100 can be the bolt compression pipe fitting, as shown, or can be any other suitable type of fitting, including but not limited to, an adapter, tee, elbow, flange, pipe coupling, and the like. The compression pipe fitting 100 can be configured to connect one or more piping components 303, 305, such as a first piping component 303 and a second piping component 305. In the present aspect, the first and second piping components 303, 305 can comprise a first pipe section 302 and a second pipe section 304 of a pipeline 300 (FIG. 9). In other aspects the components can be any suitable fitting, valve, cap, tee, or the like. The present aspect of the compression pipe fitting 100 can comprise a body portion 102, a first end portion 104 of which can be configured to slidably receive a portion of the corresponding first piping component 303, and a second end portion 134 that can be configured to slidably receive a portion of the corresponding second piping component 305. Both the first end portion 104 and the second end portion 134 can include a grip ring assembly 130 that can be disposed therein and configured both to non-rotationally fix and to axially fix the corresponding piping component within the compression pipe fitting 100. Each compression pipe fitting 100 can include a tightening assembly 195 that can allow the grip ring assembly 130 to be selectively engaged with, and disengaged from, the piping component 303, 305 disposed therein, as discussed in greater detail below.

In the example aspect shown, the body portion 102 of the compression pipe fitting 100 can include a central body portion 122 disposed between the first end portion 104 and the second end portion 134. The first end portion 104 can include a cylindrical sidewall 106 having an inner surface 108 and an outer surface 110. The side wall 106 can extend from a distal first edge 112 to a proximal second edge 114 of the first end portion 104. An annular flange 118 can extend radially inwardly from the proximal second edge 114 of the first end portion 104 so that the annular flange 118 connects the first end portion 104 to a first end 126 of the central body portion 122. The central body portion 122 can be defined by a cylindrical sidewall 124, although in other aspects the central body portion 122 need not be cylindrical. Similarly, in the present aspect shown, an annular flange 118 also can connect the second end portion 134 of the compression pipe fitting 100 to the central body portion 122 at the second end 128 thereof. Note, in the aspect shown, the second end portion 134 of the compression pipe fitting 100 can be constructed substantially similarly to the first end portion 104, with like reference numbers indicating like features. However, in other aspects the first body portion 104 and the second body portion 134 can be constructed differently and can be configured for different tasks.

Figure 4A:
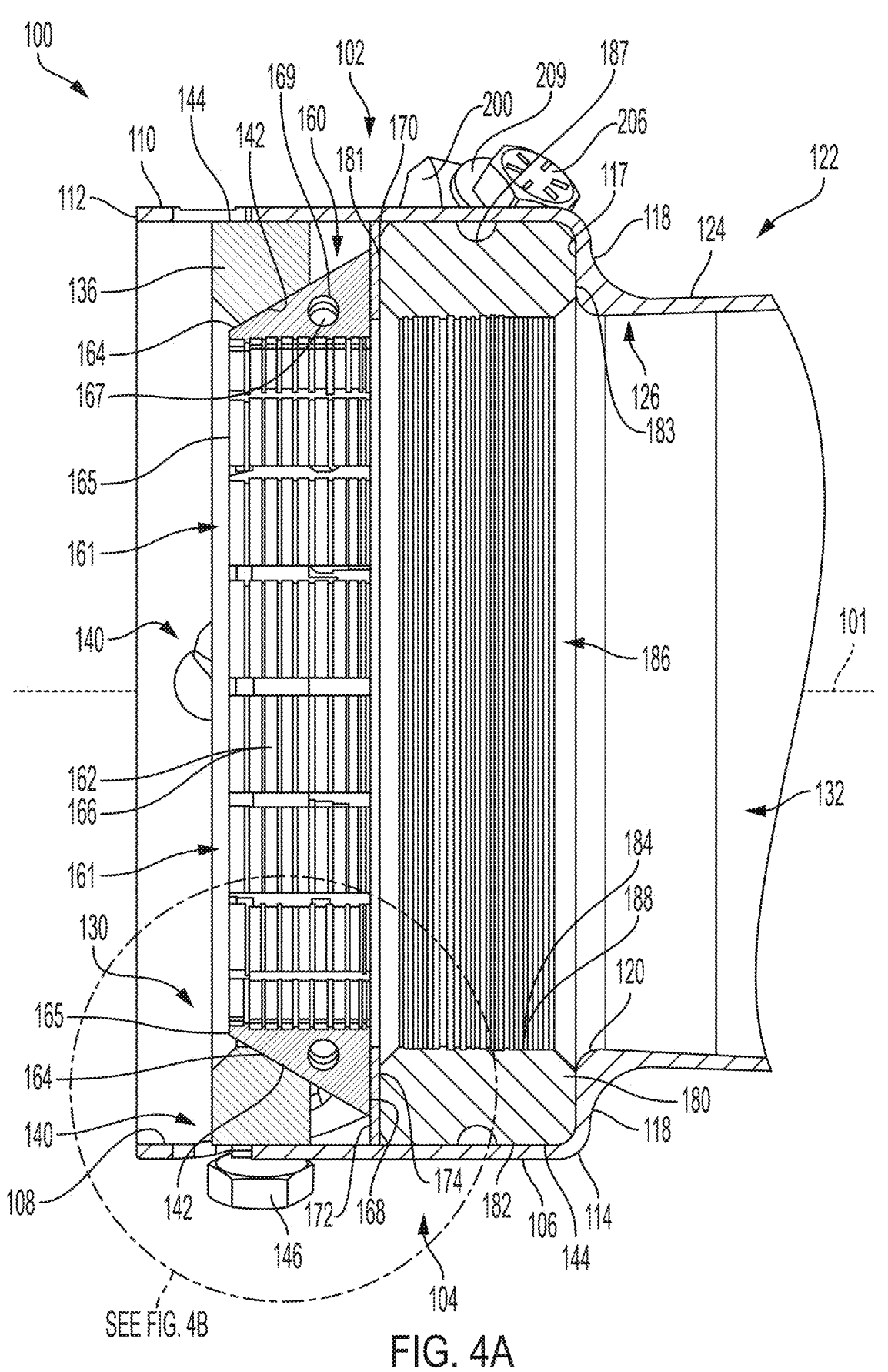
FIG. 4A is a partial cross-sectional view of the compression pipe fitting of FIG. 1, taken along line 4-4 in FIG. 3.
Figure 4B:
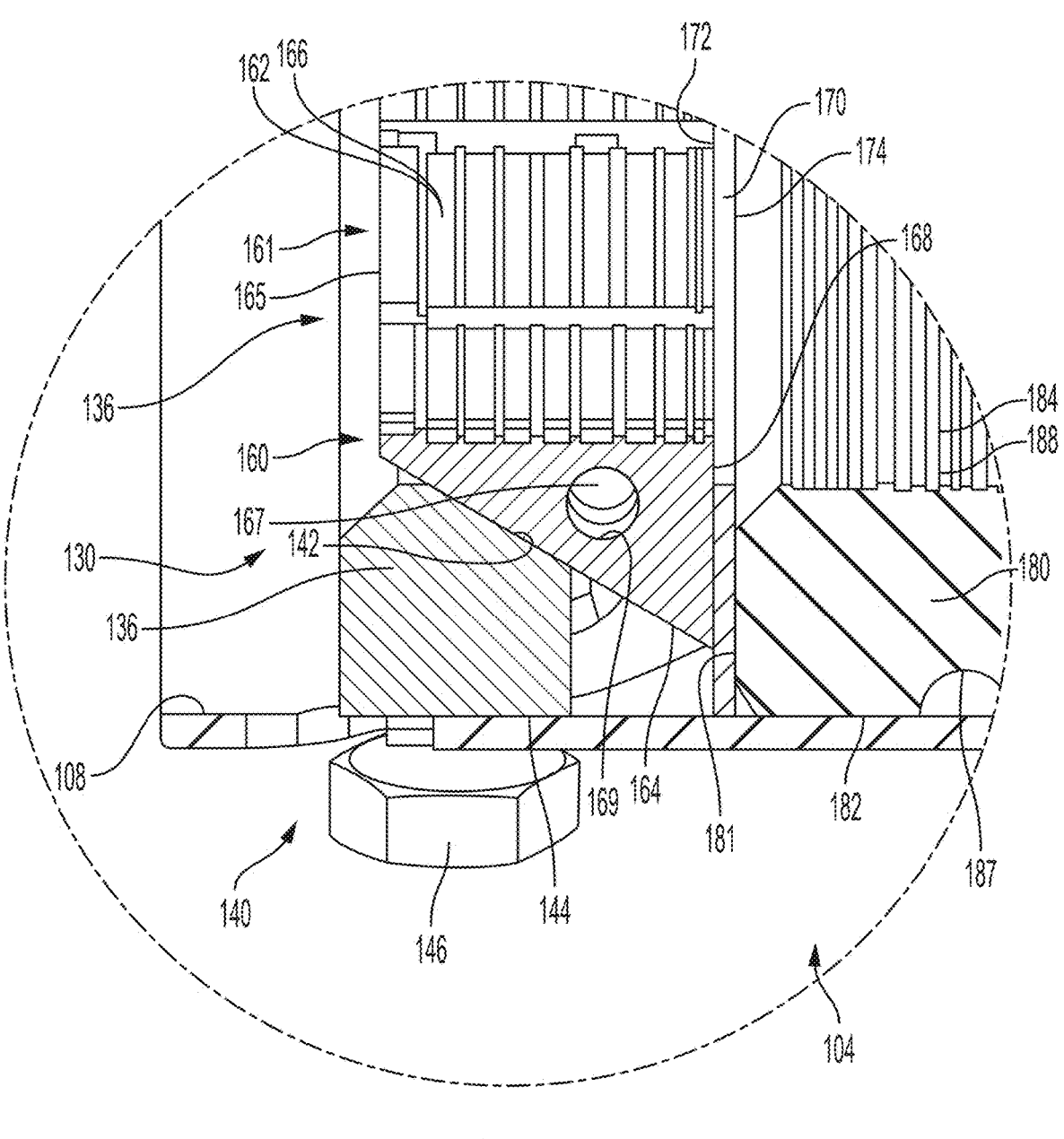
FIG. 4B is a detail view of the portion indicated by detail 4B of FIG. 4A.

As best seen in FIGS. 4A and 4B, both the first end portion 104 and the second end portion 134 of the compression pipe fitting 100 can include a grip ring assembly 130 that can facilitate securing a pair of piping components 303, 305 to the compression pipe fitting 100. As shown, both the grip ring assembly 130 and the corresponding tightening assembly 195 can be omitted from the second end portion 134 of the compression pipe fitting 100 to allow an unobstructed view of the features formed on the second end portion 134. The grip ring assembly 130 can include a cam ring 136 that can slidably engage a grip ring 160, both of which can be slidable axially within the first end portion 104 with respect to a longitudinal center axis 101 of the compression pipe fitting 100. The cam ring 136 can include a substantially cylindrical outer surface 144 that can be adjacent the inner surface 108 of the side wall 106 of the first end portion 104. The cam ring 136 can also include a frusto-conically shaped inner surface 142 that can slidably engage a corresponding frustoconically shaped outer surface 164 of the grip ring 160. The cam ring 136 and grip ring 160 can be supported on a front surface 172 of an annular washer 170 that can be axially slidable with respect to the longitudinal center axis 101. A rear surface 174 of the annular washer 170 can be disposed adjacent a front surface 181 of a compression gasket 180 that is also disposed within the first end portion 104 of the compression pipe fitting 100. In another aspect, the annular washer 170 can be omitted and the grip ring 160 can be supported on the front surface of the compression gasket 180. In various aspects, a bridge member may be utilized to bridge any gaps that might be present when the annular washer 170 is omitted. A rear surface 183 of the compression gasket 180 can be disposed adjacent and inner surface 117 of the annular flange 118 of the first end portion 104. As such, the compression gasket 180 can be configured to be selectively compressed and/or deformed between the axially slidable annular washer 170 and the stationary annular flange 118.

The cam ring 136 can include at least one axial camming assembly 140 that can include an angled cam slot 150 and a cam pin, in the instant aspect a cam bolt 146, that can be slidably disposed in the angled cam slot 150. In the aspect shown, four axial camming assemblies 140 can be positioned about a circumference of the side wall 106 of the first end portion 104. Varying numbers of axial camming assemblies 140 can be evenly spaced about the circumference of the first end portion 104 to distribute load equally on the grip ring assembly 130 when connecting the compression pipe fitting 100 to the piping components 303, 305. Note, in alternate aspects of the disclosure, as few as two axial camming assemblies 140 can be utilized.

Figure 2:
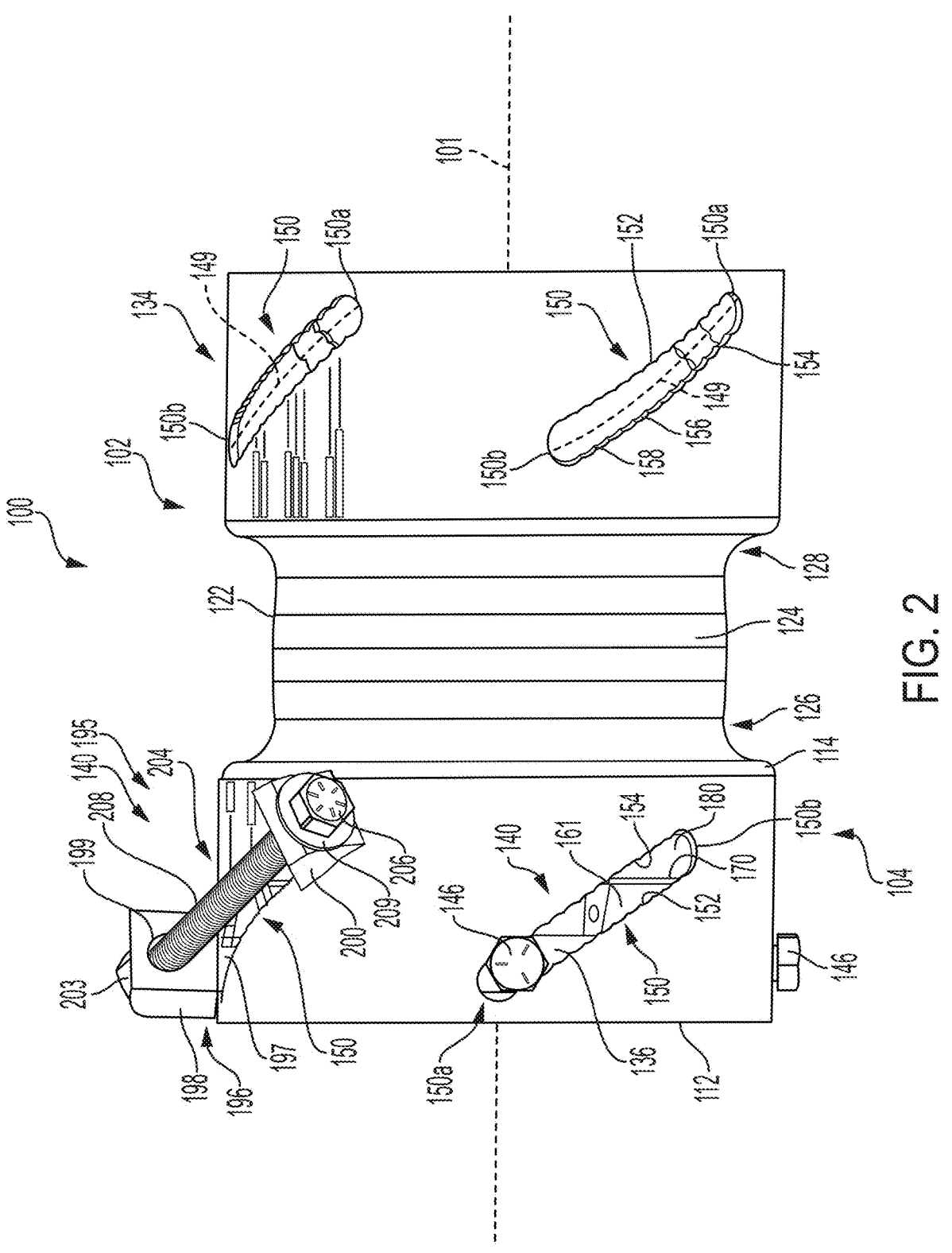
FIG. 2 is a side view of the compression pipe fitting of FIG. 1.

As best seen in FIG. 2, each angled cam slot 150 can include a first end 150a that is disposed toward the first distal edge 112 of the first end portion 104 of the body portion 102, and a second end 150b that is disposed toward the second proximal edge 114 of the first end portion 104 of the body portion 102. A longitudinal center axis 149 of the angled cam slot 150 can extend from the first end 150a to the second end 150b. The longitudinal center axis 149 of the angled cam slot 150 can form a partial helix about the longitudinal center axis 101 of the compression pipe fitting 100. The angled cam slot 150 can be defined by a first side wall 152 that can be disposed toward the first distal edge 112 of the first end portion 104. The angled cam slot 150 can be defined by a second side wall 154 that can both be disposed toward the second proximal edge 114 of the first end portion 104 and can be substantially parallel to the first side wall 152. Both the first side wall 152 and the second side wall 154 of the angled cam slot 150 can be scalloped in shape and can be formed by pluralities of alternating recesses 156 and projections 158. In alternate aspects, the first side wall 152 and the second side wall 154 of the angled cam slot 150 can be linear and smooth rather than scalloped. The cam bolt 146 of each axial camming assembly 140 can be slidably received within a corresponding angled cam slot 150, with the cam bolt 146 being fastened to the cam ring 136 of the internal ring assembly 130. As such, as the cam bolt 146 can slide along the corresponding angled cam slot 150, the cam ring 136 can move both axially and circumferentially with respect to the first end portion 104 of the body portion 102. As the cam bolt 146 can slide along the first side wall 152, the alternating recesses 156 and projections 158 can cause a clicking sound. The clicking sounds can serve as an audible indicator the relative motion of the cam bolt 146 along the cam slot 150. The clicking sound can become louder as the axial and radial loads of the compression pipe fitting 100 on a corresponding piping component 303, 305 increase. In various aspects, the scalloped shape of the first side wall 152 and the second side wall 154 can serve to retain the cam bolt 146 in a particular location.

At least one of the axial camming assemblies 140 can further comprise a tightening assembly 195. The tightening assembly 195 can be configured to facilitate moving the cam ring 136 both axially and rotationally with respect to the body portion 102. For example, the tightening assembly 195 can move the cam ring 136 from a first circumferential position, which corresponds to a first axial position, to a second circumferential position, which corresponds to a second axial position, within the body portion 102. The tightening assembly 195 can include an angled cam slot 150, a boss 200 affixed to or formed with the body portion 102, a follower assembly 196 affixed to or formed with the cam ring 136, and a tightening bolt 204 that can adjustably connect the follower assembly 196 to the boss 200. The follower assembly 196 can be affixed to the cam ring 136 and slidably received within the angled cam slot 150. The angled cam slot 150 can include a first end 150a that can be disposed toward the first distal edge 112 of the first end portion 104, and a second end 150b that can be disposed toward the second proximal edge 114 of first end portion 104. Similarly to the axial camming assemblies 140, the angled cam slot 150 of the tightening assembly 195 can include a longitudinal center axis 149 that can extend from the first end 150a to the second end 150b. The longitudinal center axis 149 of the angled cam slot 150 can form a partial helix about the longitudinal center axis 101 of the compression pipe fitting 100. As shown, the boss 200 can be affixed to the outer surface 110 of the first end portion 104 adjacent a second end 150b of the angled cam slot 150. The angled cam slot 150 can be defined by a first side wall 152 that can be disposed toward the first distal edge 112 of the first end portion 104, and a second side wall 154 that can be both substantially parallel to the first sidewall 152 and disposed toward the second proximal edge 114 of the first end portion 104. Similarly to the angled cam slots 150 of the axial camming assemblies 140, both the first side wall 152 and the second side wall 154 can be scalloped in shape as they can be formed by pluralities of alternating recesses 156 and projections 158. In another aspect, the first side wall 152 and the second side wall 154 of the angled cam slot 150 can be smooth with no recesses and projections.

Figure 6B:
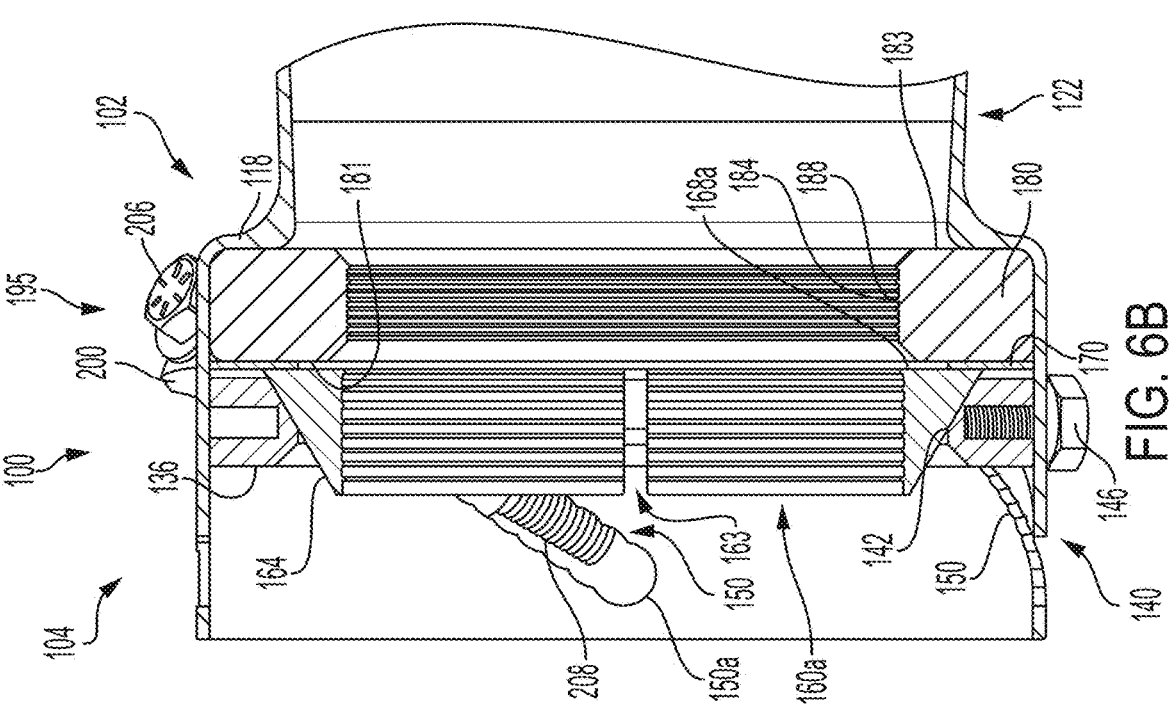
FIGS. 6A and 6B are partial cross-sectional views of the compression pipe fitting of FIG. 1 in the disengaged and engaged configurations, respectively.
Figure 6A:
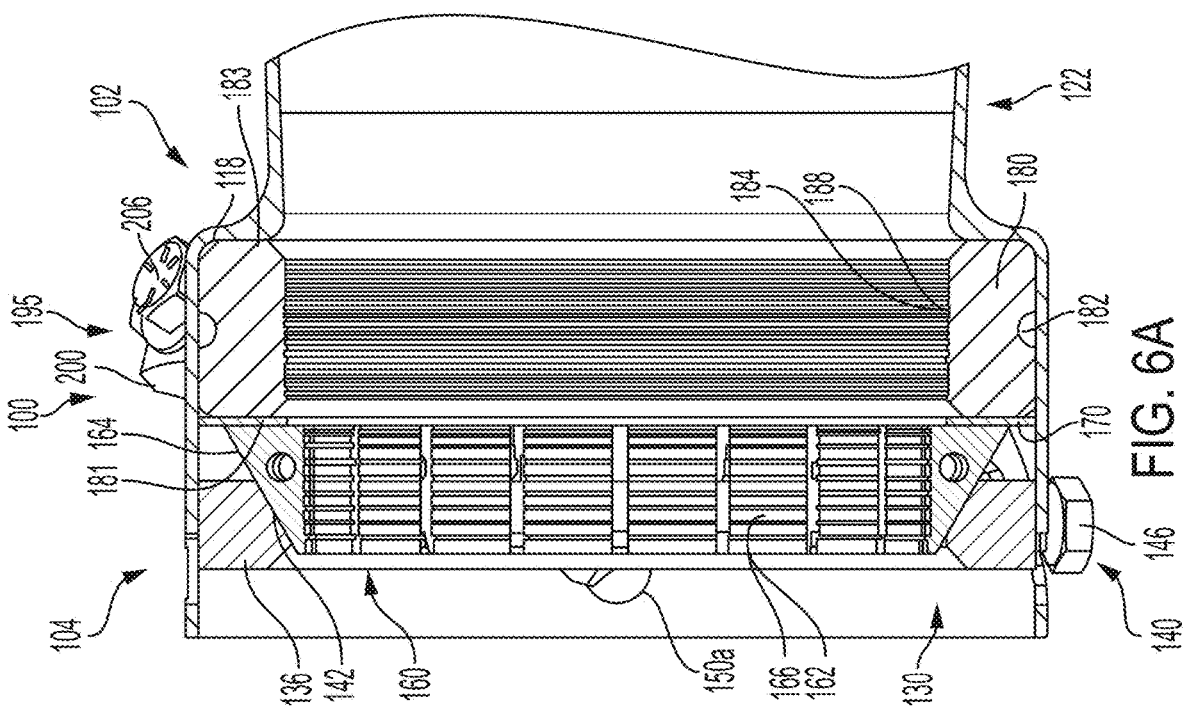

Rather than utilizing a cam bolt 146 as in the previously described axial camming assemblies 140, the tightening assembly 195 can include a follower assembly 196, as noted above. The follower assembly 196 can include a body portion 198 that can be affixed to the cam ring 136 by a cam pin 197 (FIGS. 2 and 3) that can pass through the angled cam slot 150. The body portion 198 of the follower assembly 196 can define an aperture 199 that can be configured to rotatably receive a stem 208 of a corresponding tightening bolt 204 therein. A nut 203 can be affixed to, arranged within, or formed as part of the body portion 198 of the follower assembly 196. The nut 203 can be affixed such as by welding and can be correspondingly threaded to the stem 208 of the tightening bolt 204. Similarly, the boss 200 can define an aperture 202 (FIG. 3) therein that is configured to rotatably receive the stem 208 of the tightening bolt 204 therein. A washer 209 can be disposed between a head 206 of the tightening bolt 204 and the boss 200 to facilitate rotation of the tightening bolt 204 with respect to the boss 200. Rotation of the head 206 of the tightening bolt 204 in the clockwise, or tightening, direction can cause rotation of the threaded stem 208 within the nut 203 of the follower assembly 196. As such, the nut 203 and, therefore, the follower assembly 196 can be drawn along the angled cam slot 150 toward the boss 200. The cam ring 136 can be moved axially inwardly from my first axial position within the body portion 102, as shown in FIG. 6A, to a second axial position within the body portion 102, as shown in FIG. 6B. As well, the cam ring 136 can be rotated circumferentially between a first circumferential position, as shown in FIG. 6A, to a second circumferential position, as shown in FIG. 6B, within the first end portion 104 of the compression pipe fitting 100.

Alternately, rotation of the head 206 of the tightening bolt 204 in the counterclockwise, or loosening, direction can cause rotation of the threaded stem 208 within the nut 203 of the follower assembly 196 so that the nut 203 and, therefore, follower assembly 196 can be urged along the angled cam slot 150 away from the boss 200. Alternate aspects can utilize other forms of threaded fasteners with the tightening assembly 195 such as, but not limited to, Phillips head screws, standard screws, hex screws, etc. Manual and power driven tools can be used to operate the tightening assembly 195. In various aspects, tightening assemblies 195 can comprise additional or different features to perform the tightening and untightening described herein.

Figure 3:
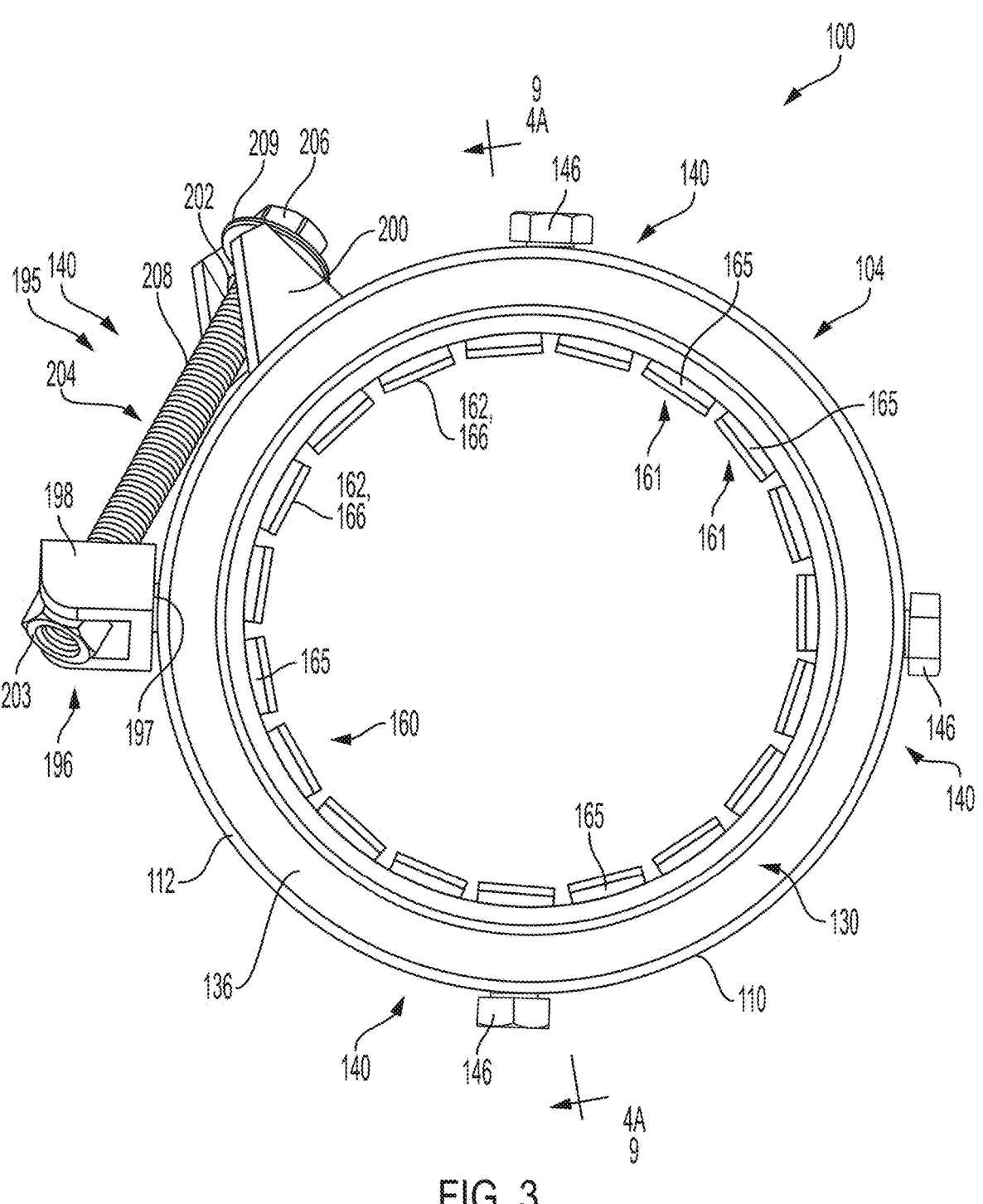
FIG. 3 is an end view of the compression pipe fitting of FIG. 1.

Referring specifically to FIGS. 3, 4A, and 4B, he grip ring 160 can be formed by a plurality of grip pads 161. Each grip pad 161 can include a base wall 168 that can be disposed adjacent the front surface 172 of the annular washer 170 and a top edge 165 that can be disposed toward the first distal edge 112 of the first end portion 104. Each grip pad 161 can also include frustoconically shaped outer surface 164 that can extend from the top edge 165 to the base wall 168. In the aspect shown, an inner surface 162 of each grip pad 161 can define a plurality of grip teeth 166 that can be configured to selectively engage an outer surface of a corresponding piping component 303, 305, such as the outer surface 307 of the first pipe section 302 shown in FIG. 9. Each grip pad 161 can further define a lateral bore 169 extending therethrough that can be configured to receive an elasticized cord 167 therein, thereby securing the plurality of grip pads 161 together to form the grip ring 160.

Figure 5:
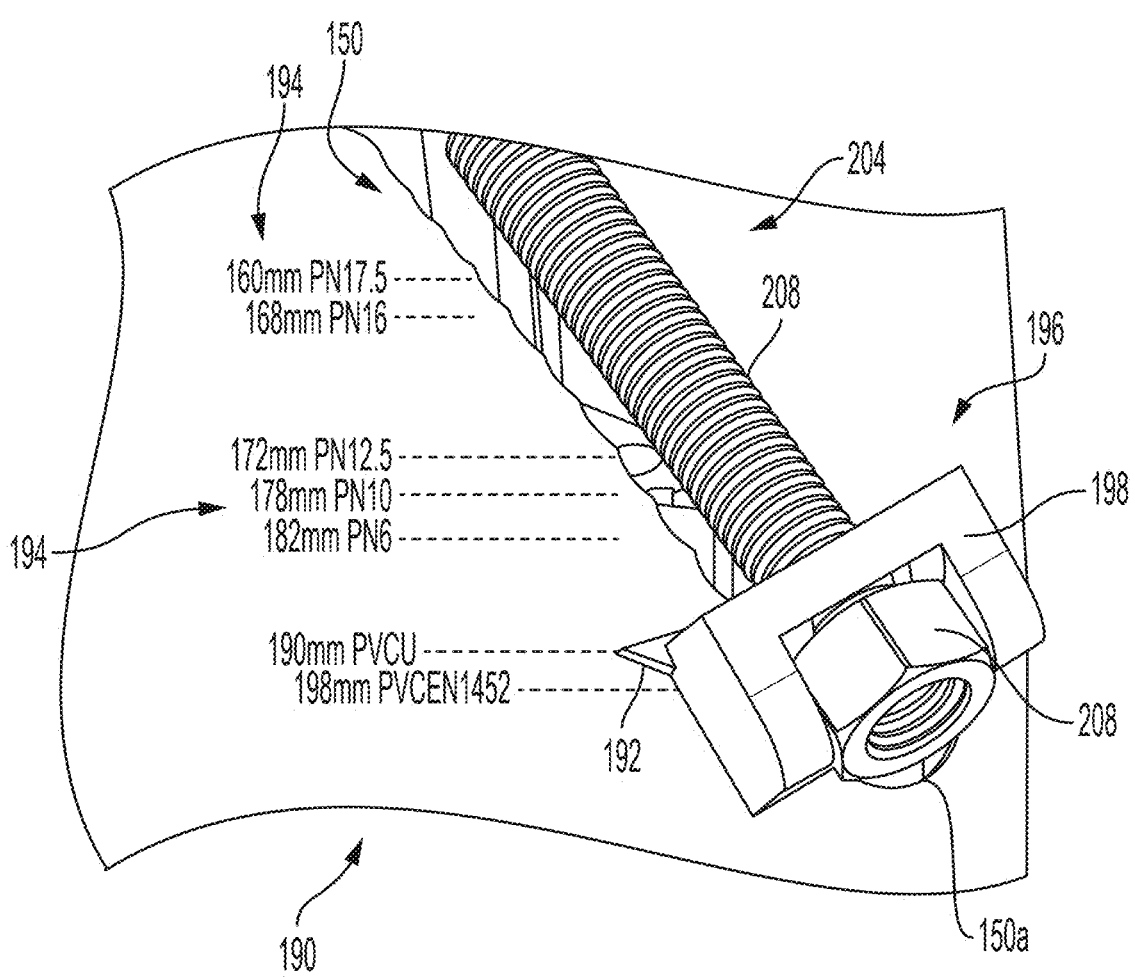
FIG. 5 is a side perspective view of an indicator assembly of the compression pipe fitting of FIG. 1.

As best seen in FIG. 5, the compression pipe fitting 100 can also include an indicator assembly 190 adapted to indicate the outer diameter of the piping component, such as the first pipe section 302 and the second pipe section 304 shown in FIG. 9, to which the compression pipe fitting 100 can be secured. The indicator assembly 190 can include a pointer 192 that can extend outwardly from the body 198 of the follower assembly 196. A plurality of indices 194 can be disposed on the outer surface 110 of the first end portion 104 adjacent the corresponding angled cam slot 150. Referring additionally to FIG. 1, when tightening the grip ring assembly 130 of the compression pipe fitting 100 onto the corresponding piping component, rotation of the tightening bolt 204 in the clockwise direction can cause the follower assembly 196 to slide along the angled cam slot 150. During tightening of the grip ring assembly 130, the follower assembly 196a can slide from the first end 150a of the angled cam slot 150 toward the second end 150b and, therefore, the boss 200. As the follower assembly 196 can move along the angled cam slot 150, the pointer 192 of the indicator assembly 190 also can move along the length of the angled cam slot 150. Upon securing the piping component 303, 305 within the compression pipe fitting 100, rotation of the tightening bolt 204 can cease and the pointer 192 can be aligned with the one of the indices 194 that most correctly indicates the outer diameter of that piping component 303, 305. For example, as shown in FIG. 5, the outer diameter of the piping component to which the compression pipe fitting 100 can be secured can have an outer diameter of approximately 190 mm. The indices 194 can also provide an acceptable range of tightening for a piping component of a given diameter. For example, adequate sealing can occur as long as the pointer 192 is disposed between two indices 194, rather than being aligned with a single one of the indices 194. In various aspects, the indices 194 can correspond with various locations of the scallops along the first side wall 152 and the second side wall 154. In various aspects, the indices 194 can be configured to indicate an approximate diameter to which the fitting should be tightened based on the type of piping component 303 utilized. For example, iron pipe sizing (IPS) and ductile iron pipe sizing (DIPS) can vary dramatically from nominal pipe size (NPS) based on materials and standards used in a particular field. Indices 194 can indicate more than just a measurement. Indices 194 can indicate the appropriate tightening location for a particular nominal pipe size and material. Indices 194 can be labeled with at least one of diameter, pipe type, pipe material, NPS, IPS, DIPS, or combinations thereof. For example indices can indicate "6 inch NPS ductile iron" at a different location than "6 inch NPS PVC." One of skill in the art would understand that these. As would be expected, the diameters of the piping components 303,305 indicated by the indices 194 can become smaller as the follower assembly 196 can move from the first end 150a of the angled cam slot 150 toward the second end 150b.

As best seen in FIGS. 4A and 4B, one aspect of the compression gasket 180 can have a planar front surface 181, a planar rear surface 183, a cylindrical outer surface 182, and a cylindrical inner surface 184. The outer surface 182 and the inner surface 184 can extend between the front wall 181 and the rear wall 183, and the inner surface 184 can define a central bore 186. One aspect of the compression gasket 180 can include a plurality of annular seal rings 188 disposed on the inner surface 184. The central bore 186 can be configured to slidably receive a portion of a piping component 303 therein, such as the first pipe section 302 shown in FIG. 9. Axial displacement of the compression gasket 180 with respect to the body portion 102 of the compression pipe fitting 100 can be prevented by the abutment of the rear wall 183 with the annular flange 118. As such, as the cam ring 136 can urge the grip ring 160 axially inwardly with respect to the longitudinal center axis 101 of the compression pipe fitting 100 as the compression pipe fitting 100 can move from a disengaged configuration (shown in FIG. 6A) to an engaged configuration (shown in FIGS. 6A and 9). Compression of the compression gasket 180 between the annular washer 170 and the annular flange 118 can cause the inner surface 184 of the compression gasket 180 to move radially inwardly as the outer diameter of the compression gasket 180 reduces. Continued axial compression of the compression gasket 180 can cause the annular seal rings 188 to engage the outer surface of the corresponding piping component 303 disposed within the central bore 186 of the compression gasket 180 as the diameter of the central bore 186 reduces further. The cylindrical outer surface 182 of the compression gasket 180 can define an annular groove 187 therein. The annular groove 187 in the outer surface 182 can facilitate the compression and/or deformation of the compression gasket 180 in the axial direction.

As noted above, and as best seen in FIG. 4A, the frustoconically shaped inner surface 142 of the cam ring 136 can be disposed adjacent the frustoconically shaped outer surface 164 of the grip ring 160. As such, the cam ring 136 can move axially inwardly in the first end portion 104 from a first axial position to a second axial position along the longitudinal center axis 101. The grip ring 160 can also move axially inwardly with respect to the first end portion 104. The cam ring 136 and grip ring 160 can move axially in unison. The grip ring 160 can become restricted from moving axially, such as when the grip ring assembly 130 encounters resistance to axial motion from the compression gasket 180. If the grip ring 160 becomes restricted, the cam ring 136 and grip ring 160 can move independently. Once compression of the compression gasket 180 between the grip ring assembly 130 and the annular flange 118 commences, continued axial force exerted on the cam ring 136 can cause the frustoconically shaped inner surface 142 of the cam ring 136 to slide axially along the frustoconically shaped outer surface 164 of the grip ring 160. The relative motion of the cam ring 136 with respect to the grip ring 160 can cause the grip pads 161 of the grip ring 160 to move radially inwardly from a first radially outward position to a second radially inward position closer to the longitudinal center axis 101. Note, the grip ring 160 can continue to move axially inwardly as the compression gasket 180 compresses, but at a slower rate than the cam ring 136, thus resulting in the relative axial motion between the cam ring 136 and the grip ring 160.

Figures 7A, 7B:
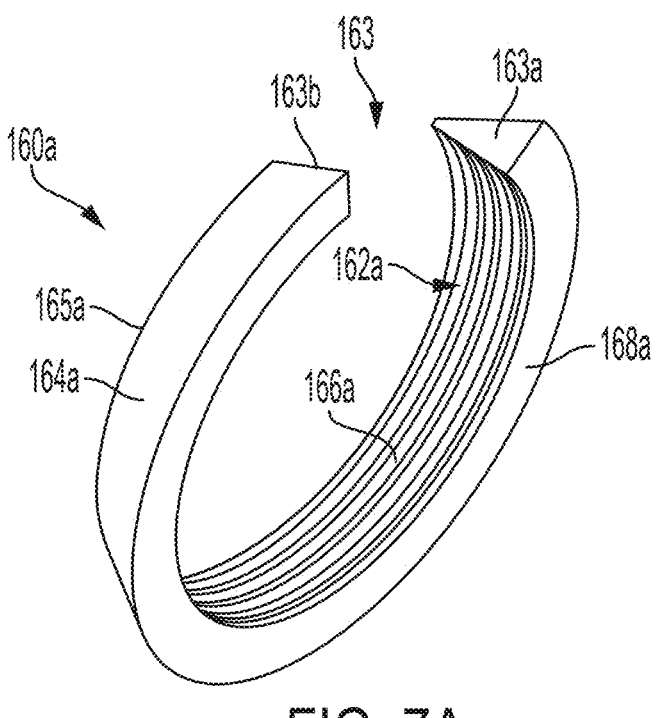
FIGS. 7A and 7B are front and rear perspective views of a grip ring of the compression pipe fitting of FIG. 1, in accordance with another aspect of the present disclosure.

Referring additionally to FIGS. 7A and 7B, another aspect of the compression pipe fitting 100 can include a unitarily formed grip ring 160a. The grip ring 160a can include a base wall 168a that can be configured to be disposed adjacent the front surface 172 of the annular washer 170 and a top edge 165a that can be disposed toward the first distal edge 112 of the first end portion 104. The grip ring 160a can include a frustoconically shaped outer surface 164a that can extend from the top edge 165a to the base wall 168a. An inner surface 162a of the grip ring 160a can define a plurality of grip teeth 166a. The grip teeth 166a can be configured to selectively engage the outer surface of a corresponding piping component 303, 305 (FIG. 9) to which the compression pipe fitting 100 can be connected. Yet other aspects of the compression pipe fitting 100 can include alternate configurations of grip rings such as those described in U.S. patent application Ser. No. 18/922,536, filed Oct. 22, 2024, the entire disclosure of which is incorporated by reference herein.

As with the previously described aspect, the frustoconically shaped outer surface 164a of the grip ring 160a can be configured to be disposed adjacent the frustoconically shaped inner surface 142 of the cam ring 136. As such, as the cam ring 136 can move axially inwardly in the first end portion 104, the grip ring 160a can also move axially inwardly with respect to the first end portion 104. The cam ring 136 and grip ring 160a can move in unison. The grip ring 160a can become restricted from moving axially, such as when the compression ring 180 offers resistance to being compressed. Continued axial force exerted on the cam ring 136 can cause the frustoconically shaped inner surface 142 of the cam ring 136 to slide axially inwardly over the frustoconically shaped outer surface 164a of the grip ring 160a. The relative motion of the cam ring 136 with respect to the grip ring 160a can cause the inner surface 162a of the grip ring 160a to move radially inwardly toward the longitudinal center axis 101 and, therefore, the outer surface 307 of the piping component 303 (FIG. 9) disposed in a central bore 167a of the grip ring 160a. A gap 163 can be defined between opposed end faces 163a, 163b of the grip ring 160a. The gap 163 can allow the diameter of the grip ring 160a to be reduced so that the grip ring 160a can be driven by the cam ring 136 from a disengaged configuration (FIG. 6A) to an engaged configuration (FIG. 6B). The gap 163 can be reduced in size as the grip ring 160a moves from the disengaged to the engaged positions.

Figure 8:
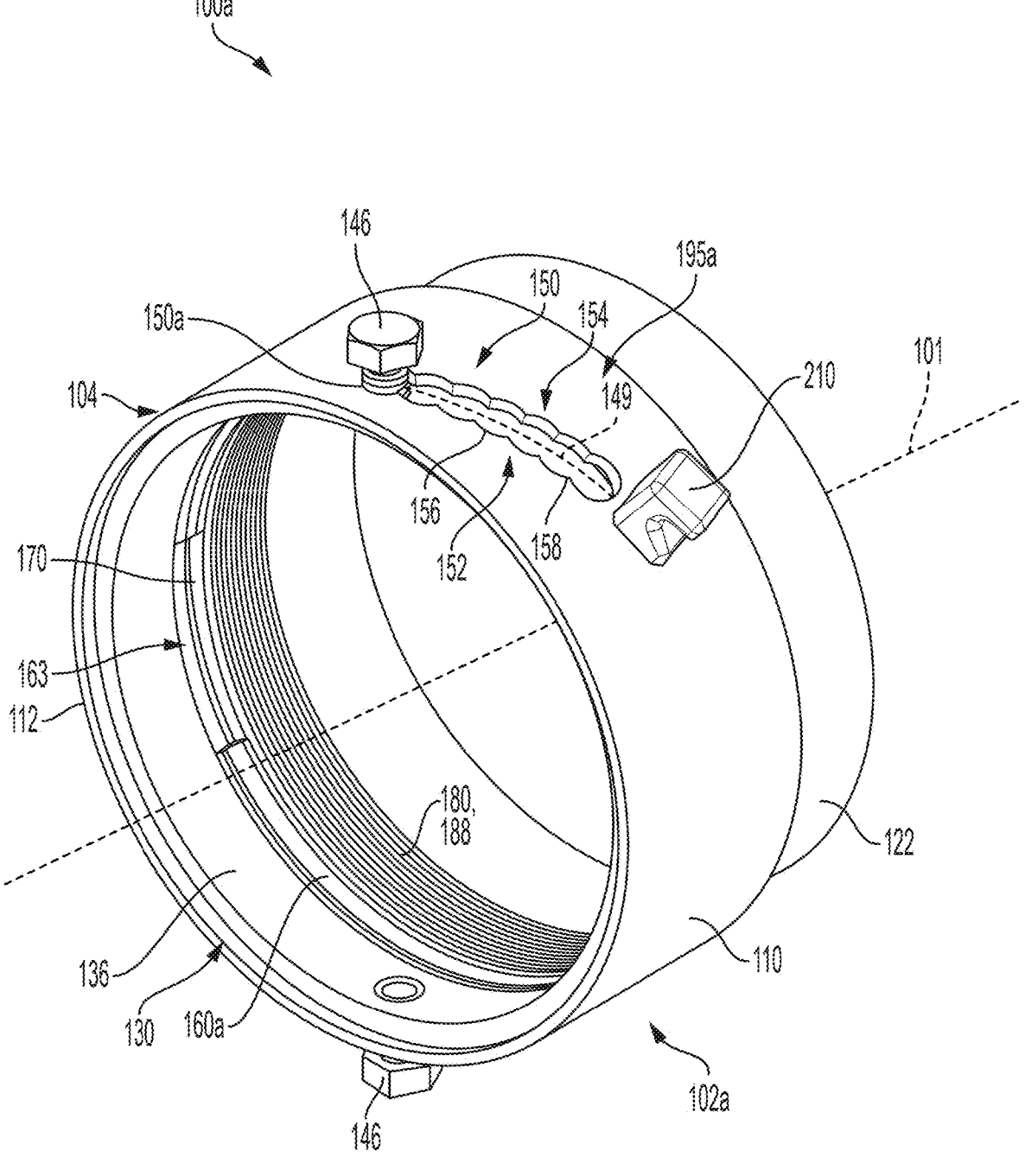
FIG. 8 is a partial top perspective view of a compression pipe fitting in accordance with an alternate aspect of the present disclosure.

Referring now to FIG. 8, an alternate aspect of a compression pipe fitting 100a in accordance with the present disclosure can include the body portion 102a having a first end portion 104, an internal grip ring assembly 130, a compression gasket 180, and a tightening assembly 195a. Compression pipe fitting 100a can have features in common with the previously described embodiment of the compression pipe fitting 100, with like reference numerals indicating similar features. However, the compression pipe fitting 100a shown in FIG. 8 can omit some features. For example, the compression pipe fitting 100a can omit any threaded fastener for connecting to a corresponding piping component, such as a first pipe section 302 shown in FIG. 9. Rather, tightening assembly 195a of the present aspect can include a tool hook 210 that can be secured to or formed with the outer surface 110 of the first end portion 104 adjacent the second end 150b of the angled cam slot 150. The tool hook 210 can be used as an anchor point for a tool, such as a C-clamp, that can be used to engage the cam bolt 146 of the tightening assembly 195a. The C-clamp can be used to draw the cam bolt 146 along the angled cam slot 150 toward the tool hook 210, thereby causing a grip ring 160a of the grip ring assembly 130 to engage the corresponding piping component 303, 305 (FIG. 9), as described above. In alternate aspects, the C-clamp can comprise an external power tool such as, but not limited to, and electric tool, a pneumatic tool, a hydraulic tool, etc. Also as described above, axial motion of the grip ring assembly 130 along the longitudinal center axis 101 of the compression pipe fitting 100a can also cause the annular seal rings 188 of the compression gasket 180 to sealingly engage the outer surface 307 of the corresponding piping component 303 (pipe section 302) disposed therein. Note, the embodiment of the compression pipe fitting 100a shown in FIG. 8 can include an annular grip ring 160a as shown in FIGS. 7A and 7B.

Rope, wire, etc., can be used to secure the cam bolt 146 in the desired position within the angled cam slot 150 upon removal of the external C-clamp from the tool hook 210 and cam bolt 146. Note, interaction between the cam bolt 146 and the recesses 156 formed in the first side wall 152 of the angled cam slot 150 can also facilitate maintaining the cam bolt 146 in the desired position as projections 158 between the recesses 156 can act as detents. Increasing the size of the projections 156 that are disposed between the recesses 158 can increase the effectiveness of the projections 156 in maintaining the cam bolt 146 in the desired position within the angled cams lot 150.

One should note that the different aspects disclosed herein can be combined such that the compression pipe fitting 100 can include the features of more than one aspect. One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A compression fitting comprising:
a body portion defining a first end portion; and
a grip ring assembly configurable in a loosened configuration and a tightened configuration, the grip ring assembly comprising a grip ring disposed within the first end portion, the grip ring being movable from a first axial position to a second axial position with respect to a longitudinal center axis of the first end portion,
wherein:
the grip ring is disposed in the first axial position when the grip ring assembly is in the loosened configuration, and the grip ring is disposed in the second axial position when the grip ring assembly is in the tightened configuration,
the grip ring is movable from a first radial position to a second radial position with respect to the longitudinal center axis of the first end portion, and wherein the grip ring is disposed in the first radial position when the grip ring assembly is in the loosened configuration, and the grip ring is disposed in the second radial position when the grip ring assembly is in the tightened configuration, and
the grip ring assembly further comprises a cam ring disposed adjacent the grip ring, wherein the cam ring is movable from a first axial position to a second axial position with respect to the longitudinal center axis of the first end portion, and the cam ring is rotatable from a first circumferential position to a second circumferential position with respect to the longitudinal center axis of the first end portion.

2. The compression fitting of claim 1, wherein:
the grip ring comprises an outer surface that is frusto-conically shaped;
the cam ring comprises an inner surface that is frusto-conically shaped and abuts the frustoconically shaped outer surface of the grip ring, and
wherein axial motion of the cam ring with respect to the grip ring along the longitudinal center axis moves the grip ring from the first radial position to the second radial position.

3. The compression fitting of claim 2, wherein the grip ring further comprises a plurality of grip pads disposed on an annular band.

4. The compression fitting of claim 2, wherein the grip ring further comprises a unitarily formed body portion having a first end face and a second end face defining a gap therebetween.

5. The compression fitting of claim 2, wherein the grip ring is rotatable with respect to the body portion of the compression fitting.

6. The compression fitting of claim 1, further comprising at least one axial camming assembly comprising a cam slot defined in a side wall of the first end portion and having a first end, a second end, and a pair of side walls extending therebetween, and a cam pin connected to the cam ring, wherein the cam pin is slidable within the cam slot.

7. The compression fitting of claim 6, wherein a longitudinal center axis of the cam slot defines a helix segment about the longitudinal center axis of the first end portion.

8. The compression fitting of claim 6, wherein a first end of the cam slot is disposed axially between a first distal edge of the first end portion and a second end of the cam slot.

9. The compression fitting of claim 6, wherein each side wall of the pair of side walls of the cam slot is linear.

10. The compression fitting of claim 6, wherein at least one side wall of the pair of side walls of the cam slot defines a plurality of projections extending inwardly therefrom so that a recess is defined between adjacent projections.

11. The compression fitting of claim 10, wherein the plurality of projections and recesses is configured to produce an audible indicator of tightening and loosening the compression fitting.

12. The compression fitting of claim 1, further comprising a tightening assembly comprising a cam slot defined in a side wall of the first end portion, a follower assembly connected to the cam ring, a boss connected to the side wall of the first end portion, and a fastener connected to the follower assembly and the boss, wherein rotation of the fastener moves the follower assembly along the cam slot.

13. The compression fitting of claim 12, further comprising an indicator assembly comprising a pointer secured to the follower assembly and a plurality of indices disposed on an outer surface of the side wall of the first end portion adjacent the cam slot.

14. The compression fitting of claim 12, wherein the fastener comprises a threaded bolt.

15. The compression fitting of claim 1, further comprising an annular gasket defining a central bore, the annular gasket being disposed in the first end portion of the body portion between a support surface of the first end portion and the grip ring assembly, wherein the central bore is a first diameter when the grip ring is in first axial position and a second diameter when the grip ring is in the second axial position, and the first diameter is greater than the second diameter.

16. The compression fitting of claim 1, wherein the grip ring assembly is a first grip ring assembly and the grip ring is a first grip ring, and the compression fitting assembly further comprises:

a second grip ring assembly configurable in a loosened configuration and a tightened configuration, the second grip ring assembly comprising a second grip ring disposed within a second end portion of the body portion, the second grip ring of the second grip ring assembly being movable from a first radial position to a second radial position with respect to a longitudinal center axis of the second end portion, and from a first axial position to a second axial position with respect to the longitudinal center axis of the second end portion, wherein the second grip ring of the second grip ring assembly is disposed in the first radial position and the first axial position with respect to the longitudinal center axis of the second end portion when the second grip ring assembly is in the loosened configuration, and the second grip ring of the second grip ring assembly is disposed in the second radial position and the second axial position with respect to the longitudinal center axis of the second end portion when the second grip ring assembly is in the tightened configuration.

17. A pipeline assembly with a first piping component having a proximal end portion, comprising:

a compression fitting comprising:

a body portion defining a first end portion and a second end portion; and a grip ring assembly configurable in a loosened configuration and a tightened configuration, the grip ring assembly comprising a grip ring disposed within the first end portion, the grip ring being movable from a first radial position to a second radial position with respect to a longitudinal center axis of the first end portion, wherein the grip ring is disposed in the first radial position when the grip ring assembly is in the loosened configuration, and the grip ring is disposed in the second radial position when the grip ring assembly is in the tightened configuration, wherein the grip ring engages an outer surface of the proximal end of the first piping component when the grip ring assembly is in the tightened configuration, wherein the grip ring is movable from a first axial position to a second axial position with respect to the longitudinal center axis of the first end portion, and the grip ring is disposed in the first axial position when the grip ring assembly is in the loosened configuration, and the grip ring is disposed in the second axial position when the grip ring assembly is in the tightened configuration, and wherein the grip ring assembly further comprises a cam ring disposed adjacent the grip ring, wherein the cam ring is movable from a first axial position to a second axial position with respect to the longitudinal center axis of the first end portion, and the cam ring is rotatable from a first circumferential position to a second circumferential position with respect to the longitudinal center axis of the first end portion.

18. The pipeline assembly of claim 17, wherein:

the grip ring assembly is a first grip ring assembly, the grip ring is a first grip ring, and the compression fitting assembly further comprises:

a second grip ring assembly configurable in a loosened configuration and a tightened configuration, the second grip ring assembly comprising a second grip ring disposed within the second end portion, the second grip ring of the second grip ring assembly being movable from a first radial position to a second radial position with respect to a longitudinal center axis of the second end portion, and from a first axial position to a second axial position with respect to the longitudinal center axis of the second end portion, wherein the second grip ring of the second grip ring assembly is disposed in the first radial position and the first axial position with respect to the longitudinal center axis of the second end portion when the second grip ring assembly is in the loosened configuration, and the second grip ring of the second grip ring assembly is disposed in the second radial position and the second axial position with respect to the longitudinal center axis of the second end portion when the second grip ring assembly is in the tightened configuration.

19. The pipeline assembly of claim 17, further comprising a second piping component having a proximal end, wherein the second grip ring of the second grip ring assembly engages an outer surface of the proximal end of the second piping component when the second grip ring assembly is in the tightened configuration.

20. The pipeline assembly of claim 19, wherein the first piping component is a first pipe section and the second piping component is a second pipe section.

21. The pipeline assembly of claim 17, wherein a bore of the grip ring defines a first diameter when the grip ring is in the loosened configuration, the bore of the grip ring defines a second diameter when the grip ring is in the tightened configuration, and the first diameter is greater than the second diameter.

* * * * *